United States Patent
Ward et al.

(10) Patent No.: US 7,431,865 B2
(45) Date of Patent: Oct. 7, 2008

(54) PRODUCTION OF AMMONIA SYNTHESIS GAS

(75) Inventors: Andrew Mark Ward, Cleveland (GB); Alan Bruce Briston, Cleveland (GB)

(73) Assignee: Johnson Matthey PLC, London (GB)

( * ) Notice: Subject to any disclaimer, the term of this patent is extended or adjusted under 35 U.S.C. 154(b) by 926 days.

(21) Appl. No.: 10/482,431

(22) PCT Filed: May 30, 2002

(86) PCT No.: PCT/GB02/02578

§ 371 (c)(1), (2), (4) Date: Jun. 29, 2004

(87) PCT Pub. No.: WO03/002452

PCT Pub. Date: Jan. 9, 2003

(65) Prior Publication Data

US 2004/0253176 A1 Dec. 16, 2004

(30) Foreign Application Priority Data

Jun. 26, 2001 (GB) ................... 0115554.8

(51) Int. Cl.
*C01B 3/24* (2006.01)
*C01B 3/26* (2006.01)

(52) U.S. Cl. ............... 252/375; 252/376; 423/359; 423/650; 423/651; 423/652

(58) Field of Classification Search ............... 423/650, 423/651, 652, 359; 252/375, 376
See application file for complete search history.

(56) References Cited

U.S. PATENT DOCUMENTS

| | | | |
|---|---|---|---|
| 2,864,772 A | 12/1958 | White | |
| 4,469,665 A * | 9/1984 | Pinto | ............ 423/359 |
| 4,529,502 A | 7/1985 | Wang | |
| 5,354,365 A | 10/1994 | Youn | |
| 5,401,483 A | 3/1995 | Ostroff | |
| 5,716,521 A | 2/1998 | Whiteley et al. | |
| 2002/0010220 A1 * | 1/2002 | Zeng et al. | ............ 518/703 |

FOREIGN PATENT DOCUMENTS

DE  34 39 059 A1  4/1986

(Continued)

OTHER PUBLICATIONS

"Catalyst Handbook", 2nd Edition, M. V. Twigg (ed.), Wolfe Publishing Ltd., London, 1989, p. 325.

(Continued)

*Primary Examiner*—Wayne Langel
(74) *Attorney, Agent, or Firm*—RatnerPrestia

(57) ABSTRACT

Ammonia synthesis gas production having a shift reaction stage employing a copper-based catalyst wherein the air supplied to the process is passed through an absorber that removes sulfur and/or halide contaminants, is described. The absorber has a support carrying an absorbent for sulfur compounds and/or absorbent for halide compounds. The removal of the contaminants improves the lifetime e.g. copper-zinc low temperature shift catalysts.

11 Claims, 1 Drawing Sheet

FOREIGN PATENT DOCUMENTS

Figure 1:
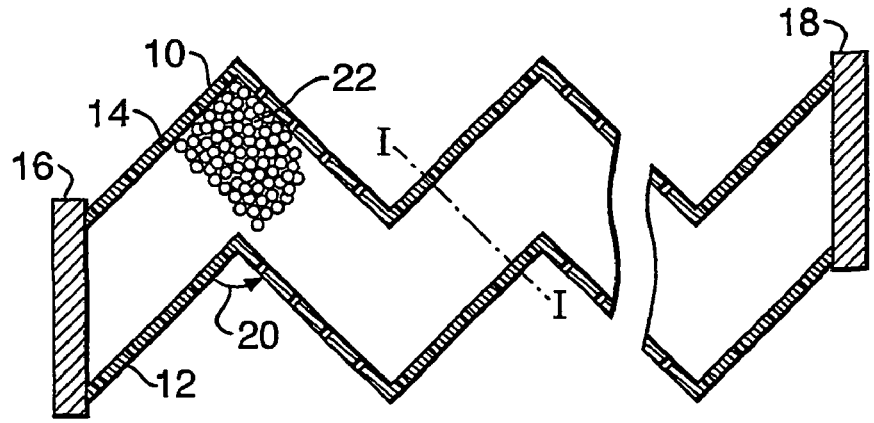

| | | |
|---|---|---|
| DE | 37 13 600 A1 | 11/1988 |
| DE | 39 05 975 A1 | 8/1990 |
| EP | 0 320 979 B1 | 6/1989 |
| GB | 1 493 172 | 11/1977 |
| JP | 200042359 | 2/2000 |
| WO | WO-99/15259 | 4/1999 |
| WO | WO-00/59610 | 10/2000 |

OTHER PUBLICATIONS

Barreteau D. et al., "Etude du Fonctionnement en Regime Transitoire D'un Reacteur Fluidise Multietage de Desulfuration," *Entropie*, vol. 19, No. 109, 1983, pp. 80-89 (English Abstract Only).

International Search Report from International Application No. PCT/GB02/02578, dated Dec. 12, 2002.

* cited by examiner

PRODUCTION OF AMMONIA SYNTHESIS GAS

This application is the U.S. National Phase application of PCT International Application No. PCT/GB02/02578.

This invention relates to ammonia production and in particular to ammonia production wherein nitrogen is introduced to the process as a consequence of partial oxidation of a carbonaceous feedstock by air.

Ammonia production requires nitrogen and hydrogen. Hydrogen is typically provided by the steam reforming and/or partial oxidation of carbonaceous material such as hydrocarbons followed by at least one shift reaction stage. Nitrogen is provided typically from air supplied to a partial oxidation stage, but may also be provided by other methods, e.g. cryogenically separated nitrogen. In the present invention, the hydrogen and nitrogen are provided as a consequence of the partial oxidation with air of a carbonaceous feedstock, e.g. natural gas, performed with or without a catalyst and which may be effected in the presence of steam and which may also follow primary steam reforming. Subsequent to partial oxidation the process gas is subjected to the shift reaction.

The reactions may be summarised as follows;

$$C_nH_{2m}+nH_2O \rightarrow (m+n)H_2+nCO$$

$$CH_4+H_2O \rightleftharpoons CO+3H_2$$

$$CO+H_2O \rightleftharpoons CO_2+H_2$$

$$2H_2+air(O_2+4N_2) \rightarrow 2H_2O+4N_2$$

Preferably a feedstock is subjected to primary steam reforming and then to secondary reforming where air is added to the partially reformed gas stream at a pressure typically in the range 10 to 50 bar abs. The reaction is exothermic and exit temperatures can reach 1000° C. The carbon monoxide in the gas leaving the secondary reformer is converted to carbon dioxide by least one shift reaction and then the carbon dioxide is removed by, e.g. scrubbing, from the gas stream. Any residual carbon oxides are then converted to methane by methanation before drying and compression of the resultant synthesis gas to ammonia synthesis pressure (generally 50-350 bar).

The shift reaction converts carbon monoxide and steam to carbon dioxide and hydrogen and reduces the carbon monoxide that poisons the ammonia synthesis catalyst Shift reactions may be performed at temperatures of around 350-500° C. (high-temperature shift), around 250-400° C. (medium-temperature shift) or around 180-250° C. (low-temperature shift). These reactions are catalysed. High-temperature shift reactions may, for example, be catalysed using a chromia-promoted iron catalyst while the medium- and low-temperature shift reaction may, for example, be catalysed using a supported copper catalyst.

Medium- and low-temperature shift catalysts are known to be prone to de-activation by sulphur and halide contaminants present in the hydrocarbon or carbonaceous feedstock and considerable efforts are made to remove these contaminants to maximise catalyst lifetime. The sulphur contaminants include hydrogen sulphide, carbonyl sulphide and organo-sulphur compounds such as thiols. Halide contaminants may include hydrogen chloride, organochlorides and sodium chloride.

The use of chloride absorbents to protect the low temperature shift catalyst is known. For example a bed of supported alkali is typically disposed prior to the low temperature shift reactor through which all the gas entering the reactor has to pass.

Process air supplied to the partial oxidation, e.g, secondary reforming step is typically filtered only to remove particulate material such as silica, and for particularly contaminated environments washing the process air has been recommended. (See for example, the Catalyst Handbook, $2^{nd}$ edition, M. V. Twigg (ed.), Wolfe Publishing Ltd, London, 1989, page 325).

We have found that sulphur dioxide, which is often present in the process air in an industrial environment, is a significant source of deactivating sulphur and that the use of an absorber specifically intended to remove sulphur and/or halide contaminants from the process air fed to an ammonia process may improve the low-temperature shift catalyst lifetime. We have found that by passing the process air through an absorbent material especially suitable for sulphur oxides, i.e. sulphur dioxide or sulphur trioxide, de-activation of the catalyst may be minimised. Furthermore, by passing the process air through an absorbent material especially suitable for airborne halide contaminants such as hydrogen chloride or sodium chloride the catalyst de-activation may be further reduced and the lifetime of any subsequent chloride absorbent extended.

Accordingly the invention provides a process for the production of ammonia synthesis gas comprising subjecting a desulphurised carbonaceous feedstock to partial oxidation with air and subjecting the resultant product to a shift reaction with steam, including a stage of shift reaction using a copper-based catalyst, wherein the air supplied for the partial oxidation is passed through an absorber comprising a support carrying an absorbent material for sulphur and/or halide contaminants.

The support for the absorbent material may be in the form of a fibrous material, a monolithic support or a particulate support.

In most ammonia plants, the process air is passed through a filter to remove dust particles. The filter will normally comprise a wad of fibrous material, for example, cotton, glass, polyamide, polyester or polyolefin fibres held between a pair of perforate metal plates. We have realised that this filter may be modified and used to effect removal of sulphur and/or halide contaminants. Thus in one embodiment of the invention, the fibrous material forms the support and is modified by coating or impregnating it with a suitable absorbent material.

In further embodiment, the air is passed through a suitable porous monolithic support, particularly a ceramic or metal honeycomb or foam, especially an alumina, mullite or cordierite honeycomb, impregnated or coated with the absorbent material. The use of such a support may be advantageous where the required air flow-rate is high, as the monolithic support will produce a comparatively low resistance to the flow of the air stream.

In further embodiment, the air is passed through a particulate support disposed in a fixed bed, impregnated or coated with the absorbent material. The particulate support provides potentially a useful high surface area for contaminant absorption. To overcome potential difficulties arising from the resistance to flow created by particulate supports, the latter are preferably disposed in fixed beds that provide a short path for the air stream. Cartridges containing beds of particulate absorbent materials are known to those skilled in the art and may be used in the process of the present invention. Such cartridges however suffer from a disadvantage that a large number (e.g. >100) may be required for industrial processes. The requirement for a large number of cartridges can lead to a complicated installation and lengthen maintenance down time. Furthermore settling and/or shrinkage of the particulate support within the beds held in the cartridges can reduce their effectiveness.

We have devised a particularly effective absorber configuration.

Accordingly the invention further provides an absorber unit comprising a particulate support impregnated or coated with an absorbent material for sulphur and/or halide contaminants, disposed as a bed of substantially constant thickness between at least one pair of spaced apart parallel corrugated perforate members wherein the corrugations extend substantially vertically, said perforate members being bounded by an impermeable end-member.

In particular the absorber unit may be used in a process for the production of ammonia synthesis gas that includes a step of subjecting a desulphurised carbonaceous feedstock to partial oxidation with air, whereby said absorber unit is used to substantially remove sulphur and/or halide contaminants from said air before said partial oxidation step.

The absorber may be installed as a single, e.g. square, rectangular or circular unit, or as a number of units shaped to fit appropriately in the air intake system for the process. The number of units is in the range 1 to 10. Installation of the complete absorber unit is possible, but it may be preferable to first install the perforate members within the air intake and then feed in using methods known to those skilled in the art, the particulate support impregnated or coated with an absorbent material through suitable sealable orifices in the perforate and/or end members. It is also possible to discharge the spent absorber material through suitable sealable orifices in the perforate and/or end members. The use of a single or small number of units in this way overcomes the difficulties with using multiple cartridges. The absorber unit dimensions will depend upon the size and shape of the air intake. For example, the absorber unit may be in the range 1 to 10 meters in height and 1 to 20 meters in width if in a square or rectangular configuration, or between 1 and 15 meters in diameter if circular.

An absorber unit will generally comprise one or more pairs of substantially parallel perforate members containing a particulate support material that has been impregnated or coated with an absorbent material, bounded by a substantially impermeable end-member. Between 1 and 5 pairs of perforate members may be used and if more than one pair is used, for example in heavily contaminated environments, the same or different absorbent materials may be provided in each pair as necessary to remove the contaminants from the air. Each pair of perforate members are preferably substantially parallel to other pairs, if present, with a distance separating each pair in the range 1 cm to 2 m. If desired, means for mixing the air flowing between the pairs of perforate members may be employed.

The perforate members may be perforate plates, meshes or grids with orifices sized to prevent leakage of the particulate support material contained therein. The perforate members containing the particulate support are substantially parallel and form therein a bed of particulate support material. The thickness of the contained bed of particulate support material is between 1 and 15 cm and preferably 1 to 10 cm.

The perforate members have substantially parallel vertical corrugations. The angle between the adjacent faces of the corrugations may be in the range 15 to 150 degrees and preferably is in the range 20 to 90 degrees. The use of corrugations provides the absorber unit with a higher surface area than a non-corrugated equivalent For example with an angle between adjacent faces of 15 degrees, the surface area is 7.6 times larger than an equivalent without corrugations. The higher the surface area, the lower the resistance to flow through the absorber and hence the lower the pumping costs. The use of vertical corrugations means that any settling of the particulate support material may leave a void at the top of the absorber. If settling is anticipated, to prevent the possibility of by-pass through said void that would otherwise reduce the effectiveness of the absorber, a baffle may be placed substantially perpendicular to the flow of air through the absorber that extends from an end member into the particulate support material for a distance greater than, preferably at least twice, the depth of the expected settling and/or shrinkage. Alternatively, baffle plates may be fitted to the exterior of the perforate members in the region expected to be effected by settling and/or shrinkage.

The absorber in the form of e.g. an absorber unit or cartridges may be used in addition to an air filter. Thus, an absorber may be placed upstream or downstream of a conventional air filter. In addition more than one absorber according to any embodiment of the present invention may be employed if desired.

The absorber is preferably installed before any compression of the air required by the process.

The absorber used in the process of the present invention comprises a support carrying an absorbent material.

The support as stated above may be any, or a combination of a fibrous material, a monolith and a particulate material. Suitable particulate supports include alumina, carbon, aluminosilicates, silica, titania, magnesia, zirconia and ceramic materials and mixtures of these. The particulate support is preferably in the form of granules, pellets, tablets or extrudates having particle sizes in the range 1 mm to 15 mm and an aspect ratio, i.e. the largest dimension divided by the smallest dimension, of preferably less than 2.

The absorbent material for removal of halide contaminants is preferably an oxide, hydroxide, bicarbonate or carbonate of a Group 1, 2 or 14 (IUPAC Periodic Table) metal. The metal may be any metal from Groups 1, 2 or 14, e.g. an alkali or alkaline earth such as sodium, potassium, beryllium, magnesium, calcium etc., or tin or lead. It is preferably selected from sodium, potassium, calcium, barium or lead. Preferred absorbent materials are sodium or potassium hydroxide, bicarbonate or carbonate and barium, calcium or lead carbonate. The absorbent material for the removal of sulphur contaminants may be the same as that for removal of the halide contaminants and/or an oxidising agent, such as manganese dioxide or potassium permanganate. Any combination of absorbent materials may be used to achieve removal of the airborne contaminants. The exact combination can be chosen depending upon the relative concentrations of sulphur and halide contaminants present in the air.

To carry the absorbent material, the support may be coated or impregnated with an aqueous solution of a suitable metal compound and dried. Alternatively, the support may be coated or impregnated with an aqueous solution of a precursor to the absorbent material, e.g. calcium or barium nitrates or lead acetate, and then transformed, if necessary, to the oxide, hydroxide or carbonate by appropriate treatment, for example treatment with a solution of an alkali metal hydroxide or carbonate and/or heating. Alternatively, where the desired absorbent material is insoluble in water, the support may be impregnated or coated with a slurry of the absorbent material.

Any combination of support and absorbent material hereinbefore described may be suitable for removing acidic gasses in the process of the present invention. For example, sodium or potassium hydroxide or carbonate or magnesium or barium carbonate on α-alumina monoliths; sodium or potassium hydroxide, bicarbonate or carbonate on a particulate high surface area alumina or aluminosilicate and potassium permanganate on alumina. Preferred absorbent materials include sodium or potassium hydroxide on an α-alumina monolith, potassium permanganate on alumina pellets, potassium hydroxide on a granular carbon/alumina support and sodium or potassium hydroxide, carbonate or bicarbonate on alumina pellets.

If desired additional compounds may be present on the particulate or monolothic supports as promoters. A preferred promoter is potassium iodide.

Where the support is the fibrous material in an air filter, the absorbent material is preferably a Group 2 or 14 metal and is used in the form of an oxide, hydroxide, carbonate or bicarbonate, rather than as a soluble salt, since the filter is often exposed to the atmosphere, and in wet weather water soluble absorbent materials might be leached from the support, thereby decreasing their effectiveness.

The process of the present invention employs a shift reaction step using a copper catalyst. This reaction may be performed at temperatures around 250-400° C. (medium-temperature shift) or around 180-250° C. (low-temperature shift) at pressures of between 1 and 100 bar and preferably between 10 and 50 bar absolute. Preferably the catalysts comprise copper supported on alumina together with zinc. The optimum copper oxide content in the unreduced catalyst is preferably in the range 30-40% by weight. The zinc oxide content may be in the range 30-55% by weight and the alumina content in the range of 5 to 40% by weight The zinc oxide component, in addition to other features, provides stability against de-activation by sulphur and/or halide contaminants.

The process of the present invention may be of particular utility where the carbonaceous feedstock is subjected to deep- or ultra-desulphurisation prior to steam reforming, for example as described in EP 0320979. In this process the carbonaceous feedstock for primary reforming is subjected to additional sulphur removal, typically using a copper-based absorbent, following traditional desulphurisation techniques. This process can reduce the sulphur content of the carbonaceous feedstock to extremely low levels (typically less than 1 part per billion). Consequently, the sulphur potentially introduced via the process air may become a significant source of deactivating sulphur compounds unless removed using an absorber according to the present invention.

An advantage of the present invention is that by providing an absorber to remove sulphur and/or halide contaminants from the process air, the catalyst lifetime may be extended. Alternatively, the amount of zinc oxide required in the catalyst to maintain a particular level of activity may be reduced. Furthermore, if the catalyst lifetime is extended, the volume of catalyst required for a given period of operation is reduced, giving the potential benefits of reduced vessel size in a new production facility or alternatively a lower pressure drop or increased throughput in an existing facility.

Figure 2:
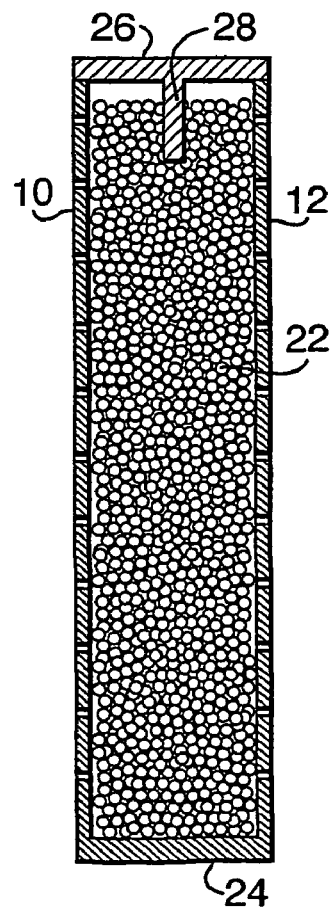

The invention will now be described by reference to the accompanying drawings in which;

FIG. 1 is a diagrammatic cross section of an absorber unit according to one embodiment of the invention; and FIG. 2 is a diagrammatic cross section through the absorber unit depicted in FIG. 1 perpendicular to the outer faces at position I-I.

In FIG. 1, the absorber unit comprises a single pair of parallel perforate plates 10 and 12 having orifices 14 to permit the flow of air into the unit and impermeable end members 16 and 18. The parallel plates 10 and 12 are corrugated with an angle 20 between adjacent faces of approximately 90 degrees. A particulate absorber 22 is disposed between the perforate plates to remove sulphur and/or halide-containing contaminants from the air as it passes through the absorber unit In FIG. 2, the particulate absorber 22, disposed between perforate plates 10 and 12, is supported by an impermeable base member 24 and is capped by top member 26. The top member 26 has a baffle 28 substantially parallel to the perforate plates extending from the top member into the particulate absorber for a depth sufficient to prevent by-pass of air due to settling.

The invention is further illustrated by reference to the following example;

EXAMPLE 1

A series of coated alumina monoliths were prepared as follows. A number of cylindrical multi-channel α-alumina monoliths of ca. 24-mm diameter, having 145 channels of triangular cross section of approximately 1 mm base and 1 mm height, and were cut into 100 mm lengths. Solutions or dispersions of four absorbent materials were prepared and each monolith section submerged in the solution or dispersion for a between 20 and 120 minutes. The monoliths were removed from the coating bath and dried at 100° C. overnight (ca 16 hours). The weights of the monoliths before and after coating were noted and used to calculate the quantity of absorbent material retained on the porous support The details are listed in Table 1.

TABLE 1

| | Sample Number | | | |
| --- | --- | --- | --- | --- |
| | 1 | 2 | 3 | 4 |
| Absorbent | NaOH | $CaCO_3$* | $Na_2CO_3$ | $BaCO_3$* |
| Weight Dry Monolith (g) | 44.4 | 45.9 | 44.8 | 44.9 |
| Concentration of Solution or Dispersion (% ww) | 33 | 10 | 19 | 10 |
| Quantity of solution or dispersion | 300 ml | 100 g | 250 g | 100 ml |
| Soaking time of Monolith (Min.) | 120 | 20 | 40 | 35 |
| Weight Dried monolith (g) | 49.5 | 49 | 46.3 | 45.4 |
| Uptake of Absorbent (g) | 5.1 | 3.1 | 1.5 | 0.5 |
| Uptake of Absorbent (% ww) | 11.5 | 6.8 | 3.3 | 1.1 |

The samples marked (*) had polyvinylacetate added to aid wetting/dispersion of the absorbent material. Sample 2 had 0.9 g of a 1% aqueous solution of polyvinylacetate added; sample 4 had 1.5 g of a 1% aqueous solution of polyvinylacetate added.

The ability of the monolith to capture sulphur dioxide was measured on a laboratory scale as follows. The monolith coated with NaOH according to Sample 1 was inserted onto a support plug of aluminosilicate fibre placed in glass tube of 25.1 mm i.d.

A mixture of oxygen (10.5% v/v), argon (1% v/v), and helium (balance) was fed to the tube at ambient temperature (ca 20° C.), and passed through the monolith at 30.0 litres/minute at a pressure of 1.1 bar abs.

In order to simulate the use of contaminated air, after approximately 2 hour operation, 1.25% v/v sulphur dioxide in neon as a diluent tracer, was added at 27.8 $cm^3$/minute to the oxygen/argon/helium stream to give a sulphur dioxide content of 11.6 ppm by volume.

The emerging gases were passed in series through a Drager tube, Drechsel bottle, containing water and methyl orange indicator, and Hewlett Packard bubble flow meter.

The Sulphur dioxide/Neon mixture was passed with the Oxygen/Argon/Helium mixture through the apparatus for 1 hr 45 minutes with no discolouration evident in the Drager tube or Drechsel bottle.

EXAMPLE 2

In a calculated example the poisoning rate for a commercially available, copper-based low temperature shift (LTS) catalyst was $3 m^3/yr$ per $10^5$ $Nm^3/hr$ of total gas flow. When the total sulphur and chloride present in the gas stream fed to the catalyst is reduced to below about 20 ppb by removal of these poisons from the process air, this rate can be reduced to $1.5 m^3/yr$ per $10 Nm^3/hr$ of total gas flow. Hence the removal of these poisons from the process air can extend the life of LTS catalyst by up to two times.

The invention claimed is:

1. A process for the production of ammonia synthesis gas comprising subjecting a desuiphurised carbonaceous feedstock to partial oxidation with air and subjecting the resultant product to a shift reaction with steam, including a stage of shift reaction using a copper-based catalyst, wherein the air supplied for the partial oxidation is passed through an absorber comprising a support carrying an absorbent material for sulphur and/or halide contaminants selected from the group consisting of manganese dioxide, potassium permanganate, and an oxide, hydroxide or carbonate of sodium, potassium, calcium, barium or lead, said absorber being installed before any compression of the air required by the process.

2. A process according to claim 1 wherein the support for the absorbent material is a fibrous material selected from the group consisting of cotton, glass, polyamide, polyester and polyolefin fibres.

3. A process according to claim 1 wherein the support is an alumina, mullite or cordierite honeycomb.

4. A process according to claim 1 wherein the support is a particulate material.

5. A process according to claim 4 wherein the support is selected from the group consisting of alumina, carbon, aluminosilicates, silica, titania, magnesia, zirconia and ceramic materials and mixtures thereof.

6. A process according to claim 1 wherein the copper-based catalyst has copper oxide content in the un-reduced catalyst in the range of 30-40% by weight.

7. A process according to claim 1 wherein the carbonaceous feedstock is subjected to a step of primary steam reforming prior to the partial oxidation.

8. A process according to claim 7 wherein the carbonaceous feedstock is subjected to deep-desuiphurisation prior to steam reforming.

9. A process according to claim 4 wherein the absorber is disposed as a bed of substantially constant thickness between at least one pair of spaced apart parallel corrugated perforate members wherein the corrugations extend substantially vertically, said perforate members being bounded by an impermeable end-member.

10. A process according to claim 9 wherein a baffle is placed substantially perpendicular to the flow of air through the absorber that extends from an end member into the particulate support.

11. A process according to claim 5 wherein the absorber is disposed as a bed of substantially constant thickness between at least one pair of spaced apart parallel corrugated perforate members wherein the corrugations extend substantially vertically, said perforate members being bounded by an impermeable end-member.

* * * * *